United States Patent
Dos Santos et al.

(10) Patent No.: US 9,720,960 B2
(45) Date of Patent: *Aug. 1, 2017

(54) REPORTING TOOLS FOR OBJECT-RELATIONAL DATABASES

(71) Applicant: International Business Machines Corporation, Armonk, NY (US)

(72) Inventors: Cassio S. Dos Santos, Boston, MA (US); Kunjavihari M. Kashalikar, Hudson, MA (US); Jean-Claude Mamou, Millbury, MA (US); Kishore Patel, Secunderabad (IN); Rong Qu, Austin, TX (US); Hong X. Zhang, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 512 days.

This patent is subject to a terminal disclaimer.

(21) Appl. No.: 14/298,750

(22) Filed: Jun. 6, 2014

(65) Prior Publication Data
US 2015/0066839 A1    Mar. 5, 2015

Related U.S. Application Data

(63) Continuation of application No. 14/015,105, filed on Aug. 30, 2013, now Pat. No. 9,342,555.

(51) Int. Cl.
*G06F 17/30* (2006.01)

(52) U.S. Cl.
CPC .. *G06F 17/30424* (2013.01); *G06F 17/30294* (2013.01); *G06F 17/30418* (2013.01)

(58) Field of Classification Search
CPC ................................................ G06F 17/30294
USPC .............................................. 707/601, 603, 604
See application file for complete search history.

(56) References Cited

U.S. PATENT DOCUMENTS

| 6,163,776 A | 12/2000 | Periwal |
| 7,546,312 B1 | 6/2009 | Xu et al. |

(Continued)

FOREIGN PATENT DOCUMENTS

WO    2007061430 A1    5/2007

OTHER PUBLICATIONS

Preliminary Amendment, Jun. 6, 2014, for U.S. Appl. No. 14/015,105, filed Aug. 30, 2013 by C.S. Dos Santos et al., Total pp. 5 [PrelimAmend (57.324)].

(Continued)

*Primary Examiner* — Baoquoc N To
(74) *Attorney, Agent, or Firm* — Janaki K. Davda; Konrad, Raynes, Davda & Victor LLP

(57) ABSTRACT

A view schema is generated from a view definition, wherein the view schema includes one or more relational views that are created by translating one or more object queries in the view definition into one or more relational queries. A report design schema is generated from the view definition by: creating one or more report tables that correspond to the one or more relational views of the view schema and extending the one or more report tables with one or more primary key constraints and one or more foreign key constraints. A reporting model is generated by reverse engineering the report design schema, wherein the reporting model includes the one or more primary key constraints and the one or more foreign key constraints. A report is generated using the reporting model, wherein the report includes the one or more primary key constraints and the one or more foreign key constraints.

7 Claims, 6 Drawing Sheets

(56) References Cited

U.S. PATENT DOCUMENTS

| | | | |
|---|---|---|---|
| 7,680,767 | B2 | 3/2010 | Adya et al. |
| 7,945,575 | B2 | 5/2011 | Cushing et al. |
| 8,239,423 | B2 | 8/2012 | Gitai et al. |
| 8,280,924 | B2 | 10/2012 | Olenick et al. |
| 8,396,901 | B2 | 3/2013 | Schnelle et al. |
| 9,342,555 | B2 | 5/2016 | Dos Santos et al. |
| 2011/0087708 | A1* | 4/2011 | Teichmann ............ G06Q 10/10 707/803 |
| 2011/0245089 | A1* | 10/2011 | Scott ................... G06F 19/366 506/7 |
| 2012/0036462 | A1* | 2/2012 | Schwartz ............. G06Q 10/06 715/771 |
| 2012/0166623 | A1* | 6/2012 | Suit .................... G06F 11/3006 709/224 |
| 2012/0166625 | A1* | 6/2012 | Suit ......................... G06F 9/06 709/224 |
| 2012/0167094 | A1* | 6/2012 | Suit .................... G06F 11/3452 718/100 |

OTHER PUBLICATIONS

U.S. Appl. No. 14/015,105, filed Aug. 30, 2013, entitled "Sreporting Tools for Object-Relational Databases", invented by Dos Santos, C.S., K.M. Kashalikar, J. Mamou, K. Patel, R. Qu, and H.X. Zhang, Total 37 pp. [Appln (57.324)].

Office Action 1, May 21, 2015, for U.S. Appl. No. 14/015,105, filed Aug. 30, 2013 by C.S. Dos Santos et al., Total 22 pp. [57.324 (OA1)].

Response to Office Action 1, Aug. 19, 2015, for U.S. Appl. No. 14/015,105, filed Aug. 30, 2013 by C.S. Dos Santos et al., Total 6 pp. [57.324 (ROA1)].

Final Office Action, Nov. 16, 2015, for U.S. Appl. No. 14/015,105, filed Aug. 30, 2013 by C.S. Dos Santos et al., Total 7 pp. [57.324 (FOA)].

Response to Final Office Action, Jan. 8, 2016, for U.S. Appl. No. 14/015,105, filed Aug. 30, 2013 by C.S. Dos Santos et al., Total 7 pp. [57.324 (RFOA)].

Notice of Allowance, Feb. 23, 2016, for U.S. Appl. No. 14/015,105, filed Aug. 30, 2013 by C.S. Dos Santos et al., Total 7 pp. [57.324 (NOA)].

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Jan. 2011, Computer Security Division Information Technology Laboratory National Institute of Standards and Technology, Total 7 pp.

\* cited by examiner

REPORTING TOOLS FOR OBJECT-RELATIONAL DATABASES

FIELD

Embodiments of the invention relate to reporting tools for object-relational databases.

BACKGROUND

Some systems have an object model (also referred to in the art as an "object-oriented model") that maps to a relational database, and this may be referred to as an "object-relational database". The object model is mapped to the relational database.

The object model describes the properties of objects and is defined using, for example, class (which defines a particular type), inheritance (which defines a relationship between objects), polymorphism (which is the ability to create a variable, a function, or an object that has more than one form), and enumeration (which is an ordered list of a set of objects).

The ability to generate reports from the relational database content using existing reporting tools allows data to be published at a lower cost and in a way that can be customized to different groups of people. These reports are typically designed using a reporting model that is created from the relational database.

A relational schema describes a structure of a relational database. A relational schema may be generated to store object models (such as those designed using Uniform Modeling Language (UML) or JAVA®). (JAVA is a trademark or registered trademark of Oracle Corporation in the United States, other countries, or both.) However, such a relational schema may not be suitable for access from outside an Object-Relational Mapping (ORM) system. Therefore, reports may not be generated accurately from such a relational schema.

Some systems use Structured Query Language (SQL) views. A SQL view may be described as resulting from execution of a stored query on data in the relational database, and this SQL view may be queried just as the data in the relational database may be queried.

SQL views, while allowing names and types to be reconciled between the relational database and object model, do not inherit some of the semantics defined in the relational schema on which they are defined. For instance, primary and foreign keys defined on a given table are not "inherited" by SQL views defined from that table. That is, the SQL views do not include relationship information. In other words, the primary and foreign keys are not part of a view definition in the database catalog, and are therefore not available to the reporting tools to infer relationships. A primary key may be described as one or more keys in a table that uniquely defines the characteristics of each row in that table. A foreign key may be described as one or more fields in a first table that uniquely identifies a row of a second table.

For example, most commercial database systems do not propagate the referential constraints of the underlying tables on which a SQL view is defined to the SQL view in the database catalog. Therefore, a reporting tool relying on the database catalog to generate a reporting model is not able to infer the original model relationships. In particular, the reporting tools use a reverse engineering process that involves inference of relationships among model entities based on relational constraints (e.g., foreign keys) and/or name matches. The reporting model designer usually has to review the inferred relationships to perform any necessary adjustments (e.g., missing relationship, wrong cardinality, etc.). That is, the report designer has to reconcile the semantics of the original object model and the persistent relational schema.

SUMMARY

Provided is a method for enabling reports in an object-relational database. A view schema is generated from a view definition, wherein the view schema includes one or more relational views that are created by translating one or more object queries in the view definition into one or more relational queries. A report design schema is generated from the view definition by: creating one or more report tables that correspond to the one or more relational views of the view schema and extending the one or more report tables with one or more primary key constraints and one or more foreign key constraints. A reporting model is generated by reverse engineering the report design schema, wherein the reporting model includes the one or more primary key constraints and the one or more foreign key constraints. A report is generated using the reporting model, wherein the report includes the one or more primary key constraints and the one or more foreign key constraints.

Provided is a computer program product for enabling reports in an object-relational database. The computer program product comprises a computer readable storage medium having program code embodied therewith, the program code executable by at least one processor to perform operations of: generating a view schema from a view definition, wherein the view schema includes one or more relational views that are created by translating one or more object queries in the view definition into one or more relational queries; generating a report design schema from the view definition by: creating one or more report tables that correspond to the one or more relational views of the view schema and extending the one or more report tables with one or more primary key constraints and one or more foreign key constraints; generating a reporting model by reverse engineering the report design schema, wherein the reporting model includes the one or more primary key constraints and the one or more foreign key constraints; and generating a report using the reporting model, wherein the report includes the one or more primary key constraints and the one or more foreign key constraints.

Provided is a computer system for enabling reports in an object-relational database. The computer system comprises: one or more processors, one or more computer-readable memories and one or more computer-readable, tangible storage devices and program instructions, stored on at least one of the one or more computer-readable, tangible storage devices for execution by at least one of the one or more processors via at least one of the one or more memories, to perform operations of: generating a view schema from a view definition, wherein the view schema includes one or more relational views that are created by translating one or more object queries in the view definition into one or more relational queries; generating a report design schema from the view definition by: creating one or more report tables that correspond to the one or more relational views of the view schema and extending the one or more report tables with one or more primary key constraints and one or more foreign key constraints; generating a reporting model by reverse engineering the report design schema, wherein the reporting model includes the one or more primary key constraints and the one or more foreign key constraints;

generating a report using the reporting model, wherein the report includes the one or more primary key constraints and the one or more foreign key constraints.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
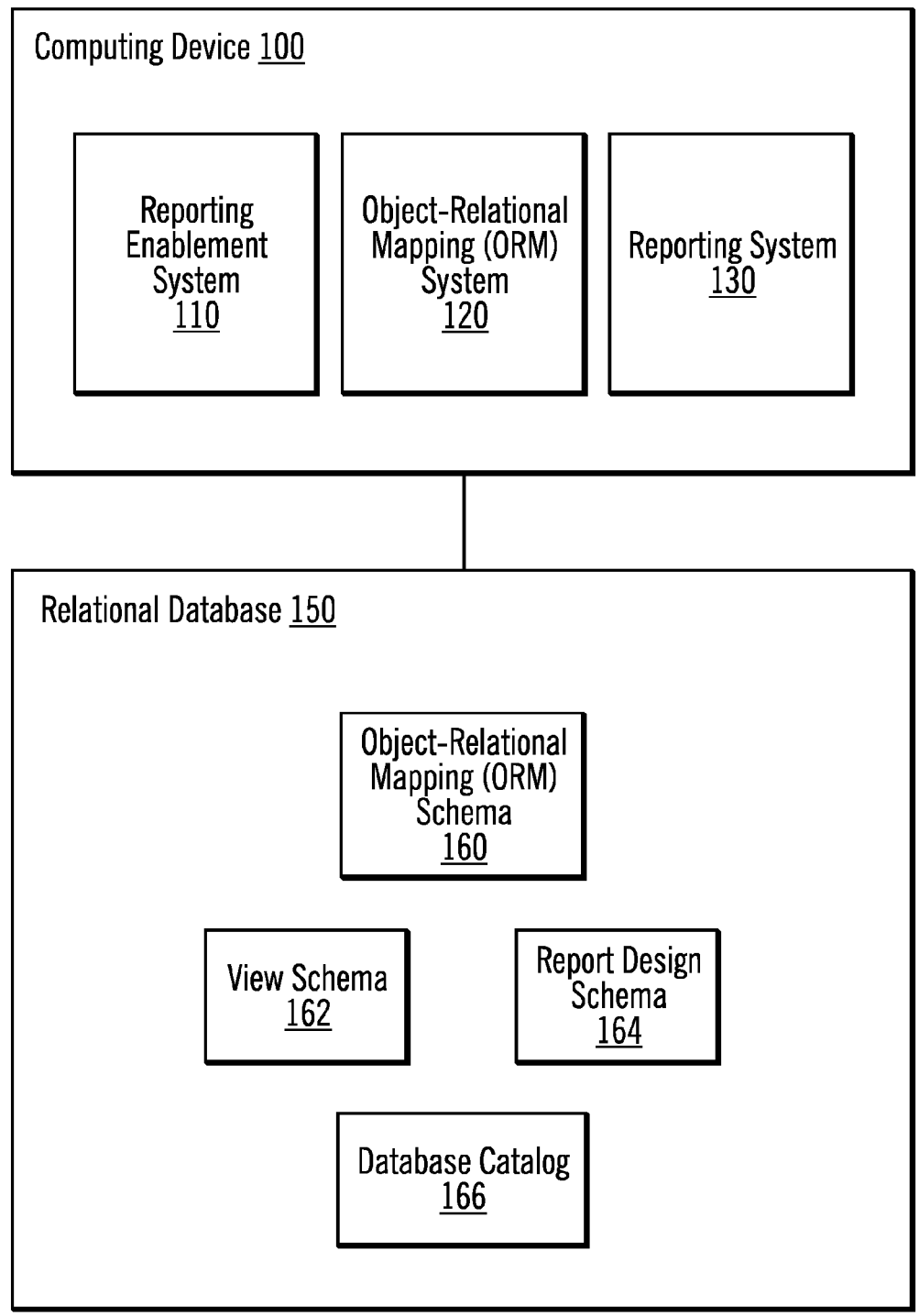
FIG. 1 illustrates, in a block diagram, a computing environment in accordance with certain embodiments.

FIG. 1 illustrates, in a block diagram, a computing environment in accordance with certain embodiments. A computing device 100 includes a report enablement system 110, an Object-Relational Mapping (ORM) system 120, and a reporting system 130. The computing device is coupled to a relational database 150. The relational database 150 includes an ORM schema 160, a view schema 162, a report design schema 164, and a database catalog 166. In certain embodiments, the relational database 150 is a Relational Database Management System (RDBMS). A relational schema defines the structure of the relational database 150.

In certain embodiments, the term "view definition" refers to a set of views specified via named object queries (in the view definition). In certain embodiments, the term "view schema" refers to a relational schema containing relational (e.g., SQL) views that are generated from the named object queries.

In certain embodiments, the ORM system 120 allows object-oriented models (e.g., UML, JAVA®, etc.) to be defined. The ORM system 120 also includes an ORM runtime which abstracts applications from relational tables to persist objects in the relational database 150. The ORM system 120 includes an object model. Applications may be implemented in terms of object model semantics (e.g., collections, reference traversal, inheritance, enumerations, etc.) and not the equivalent relational constructs (e.g., relational views (such as SQL views), inner/outer joins, look-up tables, etc.). That is, the applications may issue queries to the object model, rather than the relational database 150.

The underlying relational schema that is used to store objects is typically meant to be used by the ORM runtime. There may be differences between the ORM system 120 and the relational database 150, such as:

Table and column names in the relational database 150 do not match the equivalent original classes and attribute/reference names from which they are derived in an object model. This can happen because of relational database naming restrictions (e.g., max table/column name is limited to 30 characters).

Column data types in the relational database 150 do not match the original attribute data type in the object model. This can happen for different reasons (e.g., storing a date as a long integer, storing a Boolean value as a bit, etc.).

Modeled constraints of the object model may not map to an equivalent in the relational schema for the relational database 150 and are enforced by the ORM runtime (e.g., enumeration values, cardinality, referential integrity, uniqueness, inheritance, etc.).

Object queries of the object model may be expressed using an object-oriented query language (e.g., to form object query expressions). In certain embodiments, the reporting enablement system 110 generates a view schema 162 (e.g., a relational view schema, such as a SQL view schema) from one or more views in a view definition specified using an object model as a set of (name, object query) pairs. Such object queries of the object model should produce two-dimensional results (sets of rows of atomic values) for use in generating relational (e.g., SQL) views and are defined based on the object model semantics. Such object queries of the object model may be translated to the equivalent relational queries (e.g., SQL queries) using an object-oriented query language compiler or translator to produce corresponding views. In certain embodiments, an object query OQ1 associated to name N1 (which is a view definition based on an object model) is translated to an equivalent SQL query RQ1, and the SQL statement "CREATE VIEW N1 as RQ1" is generated to create the SQL view.

In certain embodiments, the reporting enablement system 110 generates a report design schema 164 (e.g., a relational report design schema, such as a SQL report design schema) whose tables are isomorphic (structurally equivalent) to the views in the view schema 162. In addition to the structure of the view schema 162, the report design schema 164 is enriched with the semantics (modeled types, enumerations, referential constraints, inheritance relationships, etc.) of the original object model.

In certain embodiments, the reporting system 130 is a reporting tool. The reporting system 130 may work directly with the relational database 150 to define a reporting model from which reports are derived. This process typically involves reverse engineering of the report design schema into a logical reporting model as the starting point for generating a report.

Figure 2:
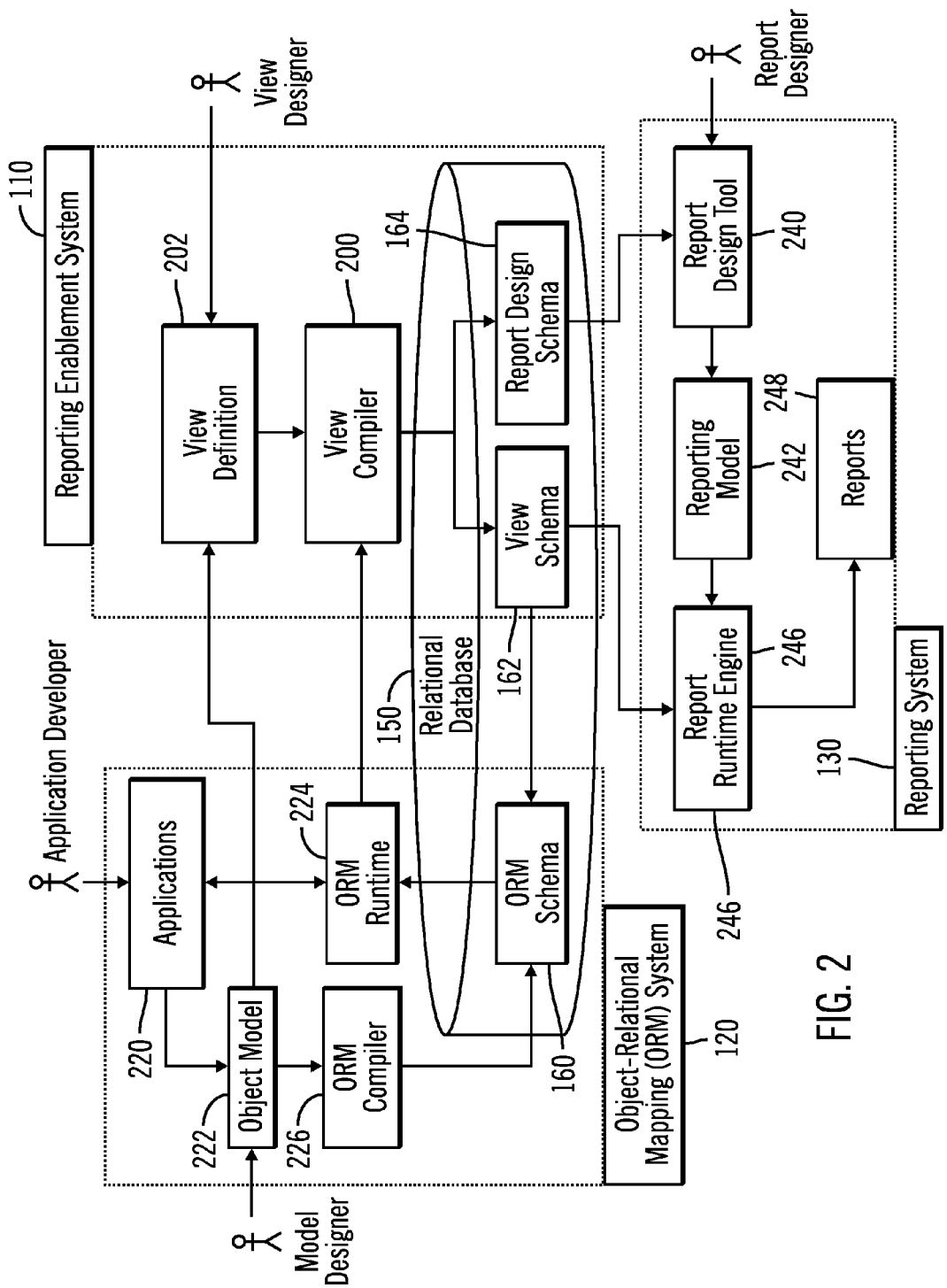
FIG. 2 illustrates, in a block diagram, further details of a report enablement system, an object relational system, and a reporting system in accordance with certain embodiments.

FIG. 2 illustrates, in a block diagram, further details of the report enablement system 110, the ORM system 120, and the reporting system 130 in accordance with certain embodiments.

In certain embodiments, the object model 222 (created by a model designer) is defined independently of other components for the development of applications 220. In certain embodiments, the ORM compiler 226 generates the ORM tables in the ORM schema 160 that are used to store instances of the object model 222 in the relational database 150. This may be static compilation.

In certain embodiments, the ORM runtime 224 maps objects in an application space (e.g., a JAVA® program or other application 220 created by an application developer) to the tables in the ORM schema 160 at runtime. During this processing at runtime, the ORM runtime 224 may save objects, update objects, delete objects, and translate object queries issued by the application 220 to relational (e.g., SQL) queries.

Thus, the output of the ORM compiler 226 forms (or produces) the content of the ORM schema 160 (tables where objects are stored).

In certain embodiments, the view definition 202 (created by a view designer) contains a set of (name, object query) pairs, and since the object queries are based on the object model 222, the view definition 202 is based on the object model.

In certain embodiments, within the reporting enablement system 110, a view compiler 200 processes a view definition 202 and produces two schemas: a view schema 162 and a report design schema 164 that are stored in the relational database 150.

In certain embodiments, the view schema 162 is composed of relational views (e.g., SQL views) based on the ORM schema 160 so that, when the report runtime engine 246 queries those relational views at runtime, the data stored in the ORM tables is accessed through the relational views. The report design tool 240 (created by a report designer) may validate and compile a report definition to output a reporting model 242 that may be executed or interpreted by the report runtime engine 246 to produce the report 248 (e.g., a business report).

In various embodiments, one or more users perform the work of the application developer, model designer, view designer, and report designer in FIG. 2.

In certain embodiments, the report design schema 164 is composed of relational tables (e.g., SQL tables) that have a 1:1 correspondence with a relational view in the view schema 162 at the table and column levels. In certain embodiments, the report design schema 164 are constructed as follows:

1. First, the report tables of the report design schema 164 may be created (e.g., using the statement CREATE TABLE table_name LIKE view_name for each of the relational views in the view schema 162). In certain embodiments, this ensures that the report tables are isomorphic to the view tables.

2. Second, once these report tables have been created, the report tables may be extended with primary and foreign key constraints inferred from query result type information collected during the compilation or translation of the object queries used in the view definition 202 and based on naming conventions. Object queries may contain multiple joins (object reference traversals), but, if the value of a result column or set of columns is populated with an object identity (as defined in the model), the relationship between that column and the target class is used to infer the corresponding foreign key in the report design schema 164.

In certain embodiments, there may be cases in which a given relationship may not be unambiguously automatically inferred, and some indication is provided in the view definition 202 as to its exact target table. For instance, if multiple selections on the same class are used to define the content of different views, and, if a relationship to that class needs to be established, then, the name of a target view may be explicitly declared, along with the referencing view definition, to avoid ambiguity and potential loss of semantics.

In certain embodiments, attributes of an enumeration type are mapped as foreign keys to corresponding automatically generated (and populated) look-up tables.

In certain embodiments, inheritance is translated to union views (union of select query expressions for each of the subclasses corresponding tables) and polymorphic references (references to a superclass) as foreign keys to such views using a well-defined naming convention.

In certain embodiments, documentation associated with the original object model 222 (e.g., class and attribute descriptions entered using the modeling tool) may be converted to the corresponding relational view catalog comments (e.g., SQL view catalog comments via statements COMMENT ON [TABLE|VIEW|COLUMN] table_name [.column_name] IS <some descriptive text>) or may be customized and maintained along with the view definition 202 to be provided as part of the report design schema documentation. Reverse engineering will typically propagate any associated documentation/description from the database catalog 166 to the reporting system catalog.

In certain embodiments, the report design tool 240 reverse engineers the report design schema 164 to produce the reporting model 242 that is used to design reports. The resulting reporting model 242 may feature all the relationships represented as foreign keys in the report design schema 164. In certain embodiments, the tables in the report design schema 164 are never populated with any data or accessed by any runtime (other than the report design tool 240 for reverse engineering).

Merely to enhance understanding, the following example view definition, view schema, and report design schema are provided.

In the following example, in an object model named "Glossary", the class "BusinessTerm" has, among many other attributes and references, a reference (relationship) named "classifies" to an abstract class named "MainObject", which is inherited by several classes across several models, including BusinessTerm. In this example, some of the attributes are internal and not meant to be exposed to report designers. Also, in this example, some of the references are normalized, but would be easier to be used by read-only applications if denormalized. Therefore, for this example, a view of the class is defined to filter out some of the attributes, references, and inline attributes of related objects (de-normalization).

The following example uses an Object Management Group (OMG) Query Language (OQL)-like syntax to illustrate how a name may be associated with a query expression as part of a view definition:

PublicBusinessTerm.query=\
      select term.ID, term.name, term.category, term.definition, \
        term→of Category.name as categoryName, \
        term→replacedByTerm.ID as replacingTerm \
    from term in BusinessTerm \
    where term.isPublic=true
    PublicBusinessTerm.foreignKey=replacingTerm:PublicBusinessTerm
    PublicBusinessTerm.description=A term that is visible to every user.
    PublicBusinessTerm.superclass=GlossaryBusinessTerm In the example above, the "view definition" is an object query (select-from-where) to which a name is associated (PublicBusinessTerm). In addition to the query defining entry, other associated entries may be provided (e.g., to further elaborate on or further illustrate the content of the view definition). A "PublicBusinessTerm.description" may provide custom descriptive text if the one associated with the queried class in the object model is not available or not appropriate.

The view compiler processes the view definition above to generate the corresponding view in the view schema and corresponding table in the report design schema, as illustrated below. In this example, all the tables used by the ORM runtime are in a view schema named "gloss" and all the tables in that view schema are prefixed with the model name. Views are generated in a separate schema named "vgloss". The report design schema tables are generated in a separate schema named "dgloss". The use of distinct schemas to group views and report design tables allows different schema level access rights to be associated to different groups of users as well as different, but overlapping view sets to be maintained independently from each other.

The following is an example of a generated view schema view:

CREATE VIEW vgloss.PublicBusinessTerm AS
        select term.ID, term.name, term.category,
            term. definition, category.name as categoryName,
            anotherTerm.ID as replacingTerm
        from term in gloss.GlossaryBusinessTerm inner join
            category in gloss.GlossaryBusinessCategory left outer join
            anotherTerm in gloss.GlossaryBusinessTerm
    where term.is Public=true The following is an example of generated report design tables:

CREATE TABLE dgloss.PublicBusinessTerm LIKE vgloss.PublicBusinessTerm;
    ALTER TABLE dgloss.PublicBusinessTerm ADD CONSTRAINT ID PRIMARY KEY (ID);
    ALTER TABLE dgloss.PublicBusinessTerm ADD CONSTRAINT hasSuperclass FOREIGN KEY (ID) REFERENCES dgloss. GlossaryBusinessTerm;
    ALTER TABLE dgloss.PublicBusinessTerm ADD CONSTRAINT anotherTerm FOREIGN KEY (anotherTerm) REFERENCES dgloss.PublicBusinessTerm;
    COMMENT ON TABLE dgloss.PublicBusinessTerm IS 'A term that is visible to every user.'

In this example, ALTER TABLE statements are used to add constraints to the tables.

Also, in this example, by reverse engineering the schema "dgloss" into a reporting model, the report design tool captures the intended semantics of the original object model as exposed through the view definition.

In certain embodiments, as the original object model evolves, any associated view definitions may be updated to take into account the object model changes and/or preserve backward compatibility to applications defined against the generated schemas (report design schema for report design time and view schema for report runtime).

Figure 3:
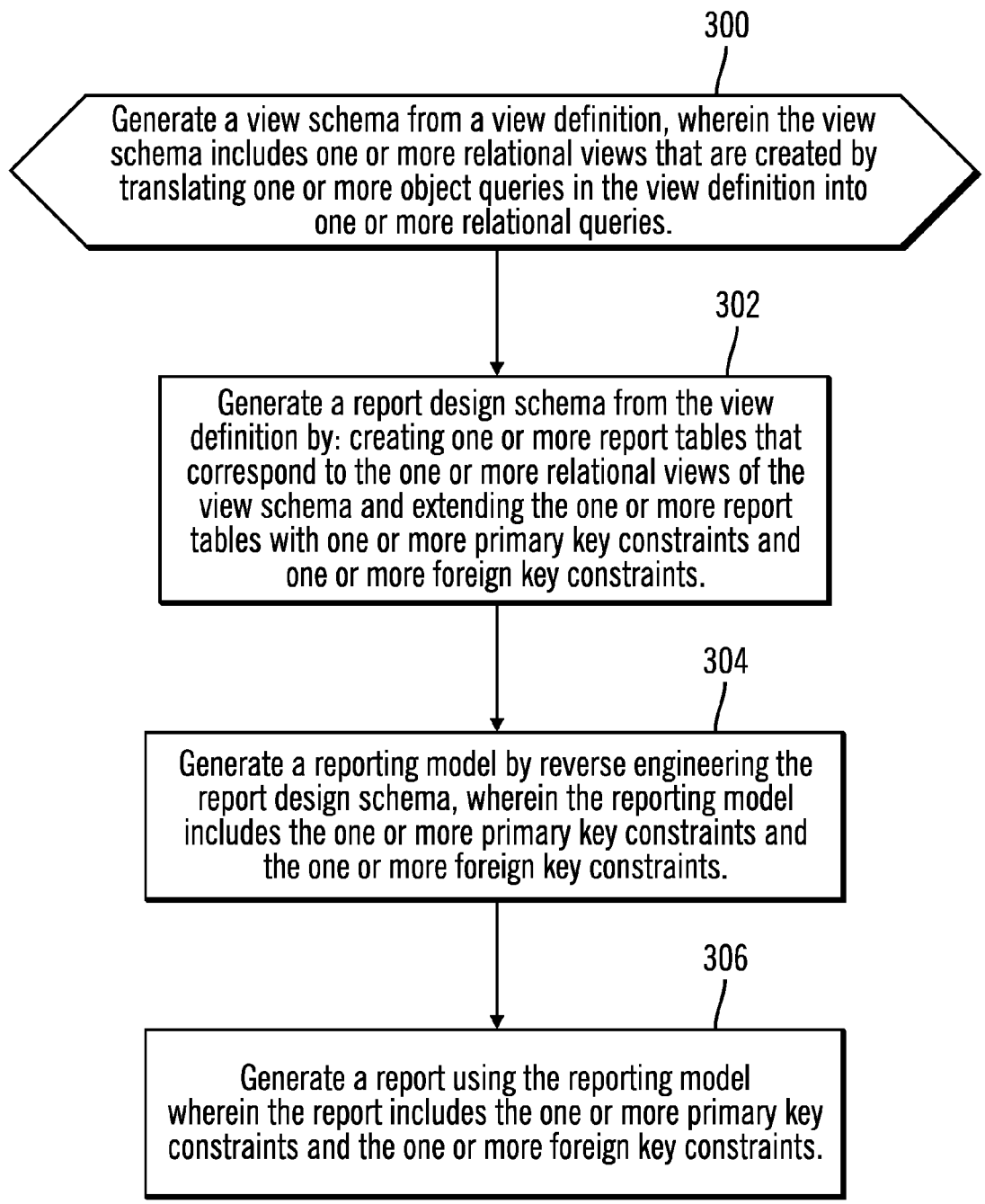
FIG. 3 illustrates, in a flow diagram, operations performed to enable a reporting system to generate reports from an object-relational database in accordance with certain embodiments.

FIG. 3 illustrates, in a flow diagram, operations performed to enable a reporting system to generate reports from an object-relational database in accordance with certain embodiments. Control begins at block 300 with the reporting enablement system 110 generating a view schema from a view definition, wherein the view schema includes one or more relational views that are created by translating (or compiling) one or more object queries in the view definition into one or more relational queries. In certain embodiments, the one or more relational queries are executed to create the one or more relational views. In block 302, the reporting enablement system 110 generates a report design schema from the view definition by: creating one or more report tables that correspond to the one or more relational views of the view schema and extending the one or more report tables with one or more primary key constraints and one or more foreign key constraints. In block 304, the reporting enablement system 110 generates a reporting model by reverse engineering the report design schema, wherein the reporting model includes the one or more primary key constraints and the one or more foreign key constraints. In block 306, the reporting enablement system 110 generates a report using the reporting model, wherein the report includes the one or more primary key constraints and the one or more foreign key constraints. In certain embodiments, a query of the one or more relational views accesses data stored in object-relational mapping tables.

In certain embodiments, the reporting enablement system 110 automatically enables the use of reporting tools for object-relational databases. In certain embodiments, the reporting enablement system 110 provides an automated way to generate reporting models suitable for reporting tools to operate on the ORM system 120 because the intended semantics of the reporting models is inferred from the ORM system and associated object-relational mappings. For example, the concept of object-oriented inheritance may be captured in different ways as an object model is mapped to a relational schema, with the runtime semantics being captured in the object-relational mapping. The reporting enablement system 110 makes this available in the database catalog to an application (e.g., a reporting tool).

In certain embodiments, the reporting enablement system 110 automatically derives a reporting model from an ORM view definition. In such embodiments, the reporting enablement system 110 provides report designers with a report design schema that reflects the semantics (e.g., modeled constraints) of the original object model and that may be used for reporting purposes.

In certain embodiments, the reporting enablement system 110 allows for declarative definition of views based on the application object (non-relational) model and associated query language in a database independent way, without requiring the original model or underlying persistent view schema (e.g., SQL view schema) to be published to report engineers. In addition, the reporting enablement system 110 automates the creation of a relational schema used by reporting tools at design time without loss of semantics of the original model.

In certain embodiments, the ORM system 120 allows object-oriented models to be compiled into a relational schema so that applications manipulating instances of that object model can persist and retrieve objects through native Application Programming Interfaces (APIs) and query language statements. With embodiments, the application does not see or know anything about the underlying relational schema, and the constraints defined in the object model are enforced by the ORM runtime.

Certain embodiments provide a view definition framework in which views may be defined using an object model using a declarative object-oriented query language. In certain embodiments, the type of object query used in a view definition is a collection of rows whose columns have atomic types.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
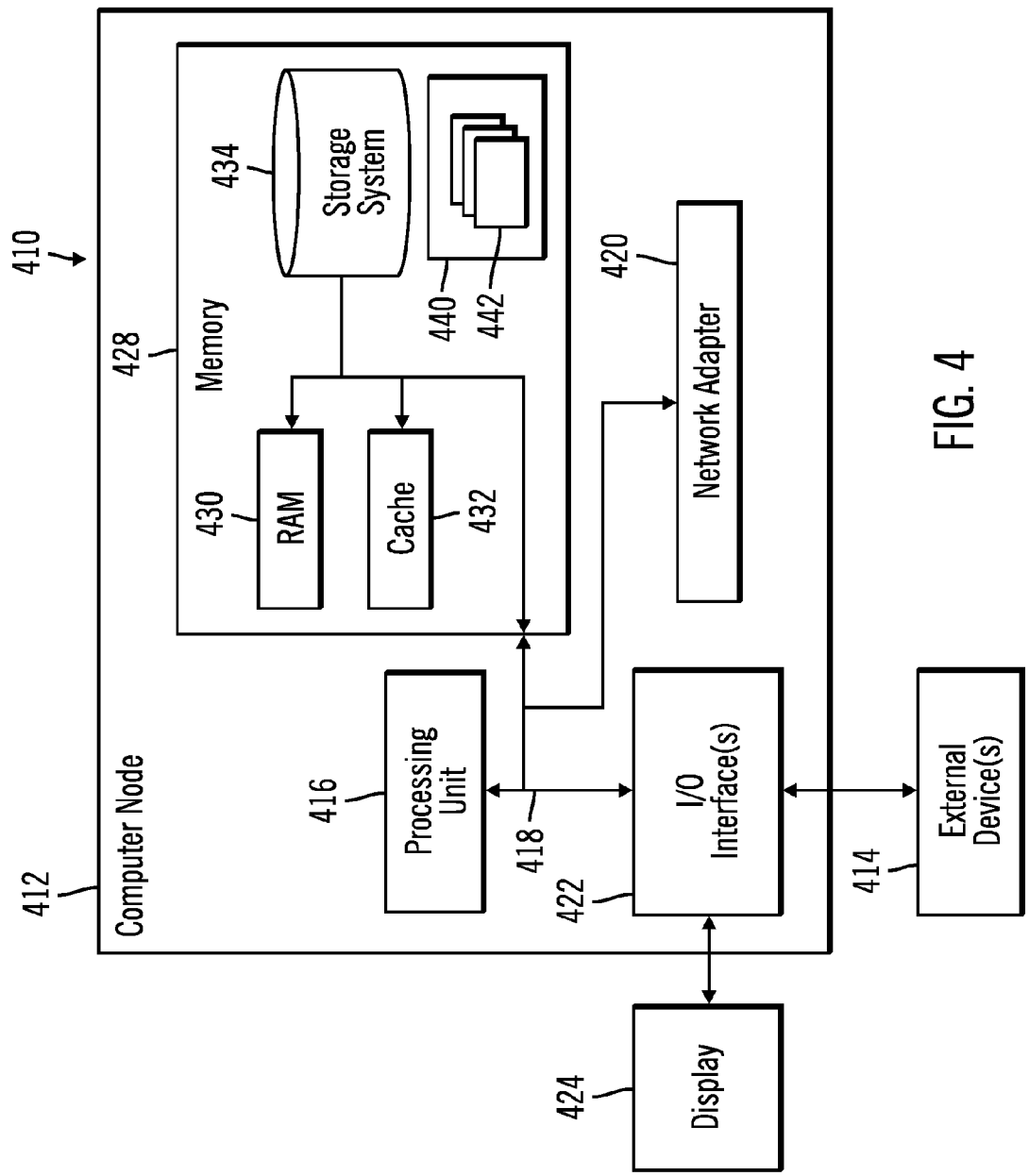
FIG. 4 illustrates a cloud computing node in accordance with certain embodiments.

Referring now to FIG. 4, a schematic of an example of a cloud computing node is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to a processor or processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
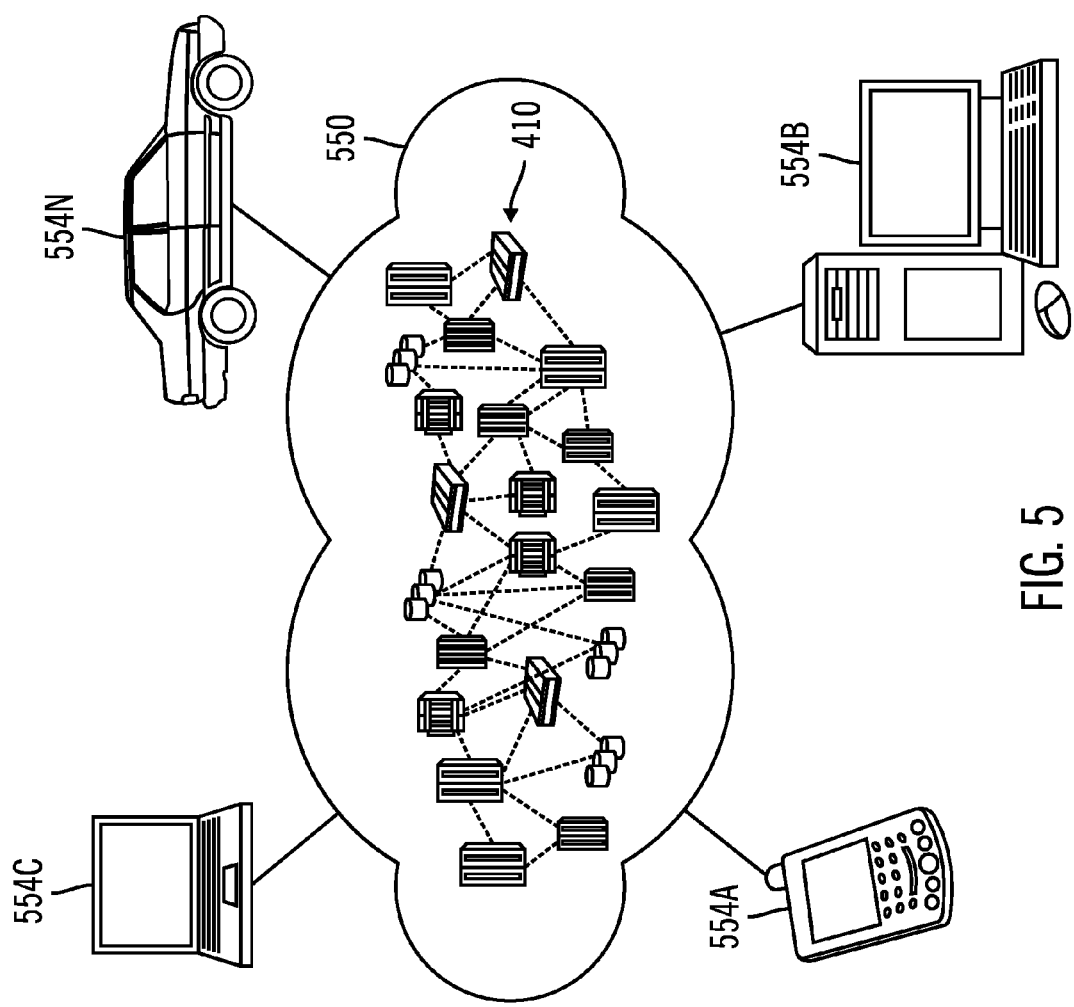
FIG. 5 illustrates a cloud computing environment in accordance with certain embodiments.

Referring now to FIG. 5, illustrative cloud computing environment 550 is depicted. As shown, cloud computing environment 550 comprises one or more cloud computing nodes 410 with which local computing devices used by cloud consumers, such as, for example, personal digital assistant (PDA) or cellular telephone 554A, desktop computer 554B, laptop computer 554C, and/or automobile computer system 554N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 410 and cloud computing environment 550 can communicate with any type of computerized device over any type of network and/or network addressable connection (e.g., using a web browser).

Figure 6:
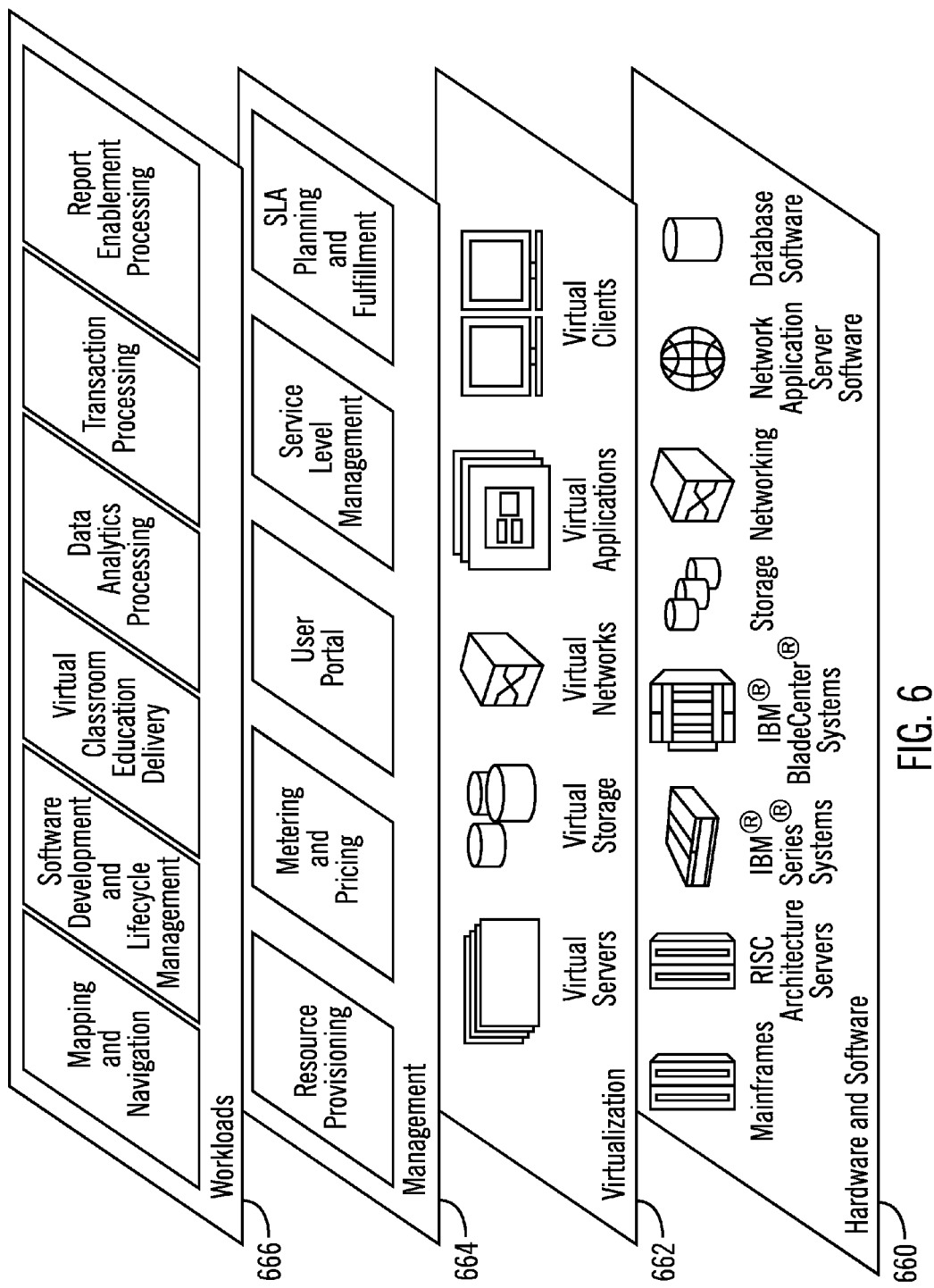
FIG. 6 illustrates abstraction model layers in accordance with certain embodiments.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and report enablement processing.

Thus, in certain embodiments, software or a program, implementing report enablement processing in accordance with embodiments described herein, is provided as a service in a cloud environment.

In certain embodiments, the computing device 100 has the architecture of computing node 410. In certain embodiments, the computing device 100 is part of a cloud environment. In certain alternative embodiments, the computing device 100 is not part of a cloud environment.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A method, comprising:
   generating, using a processor of a computer, a view schema from a view definition, wherein the view schema includes one or more relational views created by translating one or more object queries in the view definition into one or more relational queries;
   generating a report design schema from the view definition by:
   creating one or more report tables corresponding to the one or more relational views of the view schema; and
   extending the one or more report tables with one or more primary key constraints and one or more foreign key constraints;
   generating a reporting model by reverse engineering the report design schema, wherein the reporting model includes the one or more primary key constraints and the one or more foreign key constraints; and
   generating a report using the reporting model, wherein the report includes the one or more primary key constraints and the one or more foreign key constraints.

2. The method of claim 1, further comprising:
executing the one or more relational queries to create the relational views.

3. The method of claim 1, wherein the primary key constraints and the foreign key constraints are inferred from query result type information collected during the translation of the object queries and based on naming conventions.

4. The method of claim 1, wherein the view definition includes a set of name and object query pairs for the one or more object queries, and wherein the one or more object queries are based on an object model.

5. The method of claim 1, wherein a query of the one or more relational views accesses data stored in object-relational mapping tables in an object-relational mapping schema.

6. The method of claim 1, wherein documentation associated with the object model is converted to relational view catalog comments, and wherein the reverse engineering propagates the relational view catalog comments to a reporting tool catalog.

7. The method of claim 1, wherein a Software as a Service (SaaS) is provided to perform the method.

\* \* \* \* \*